April 24, 1951 W. C. KIRK ET AL 2,550,069
THERMOSTATICALLY CONTROLLED MIXING VALVE
Filed June 25, 1946 2 Sheets-Sheet 1
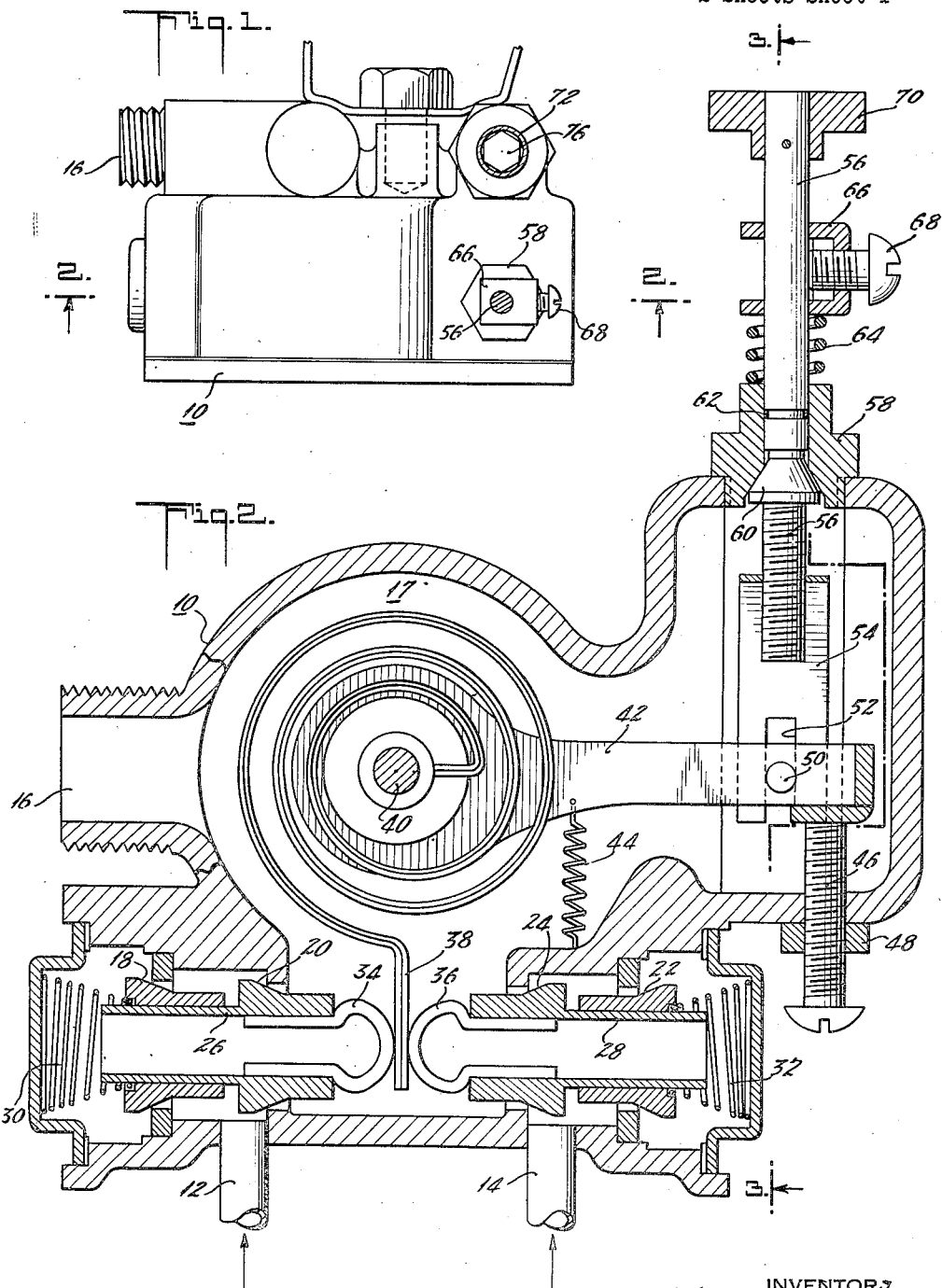
INVENTORS
Wayne C. Kirk
Malcolm K. Parkhurst
BY
ATTORNEY

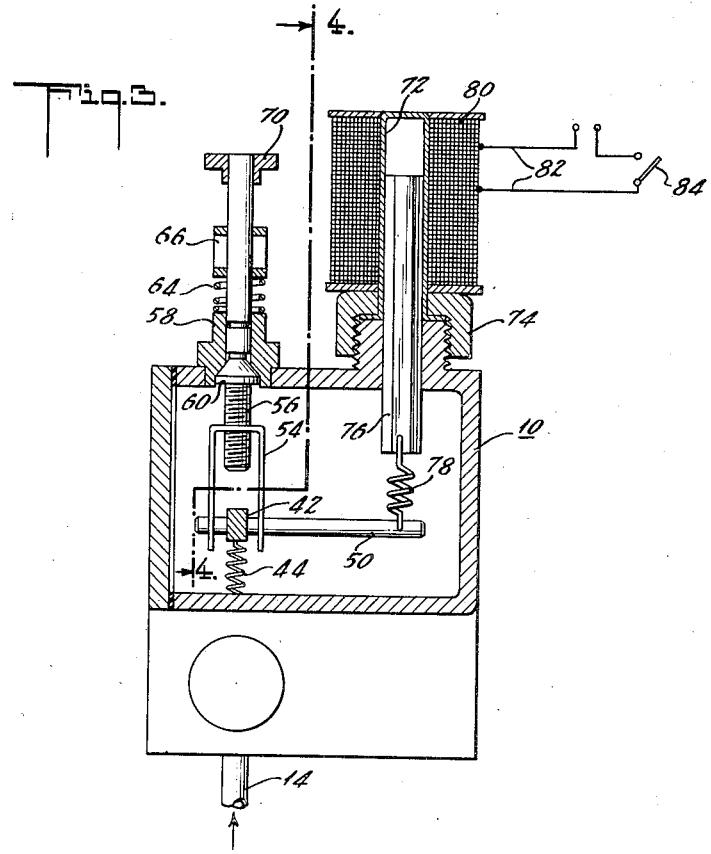
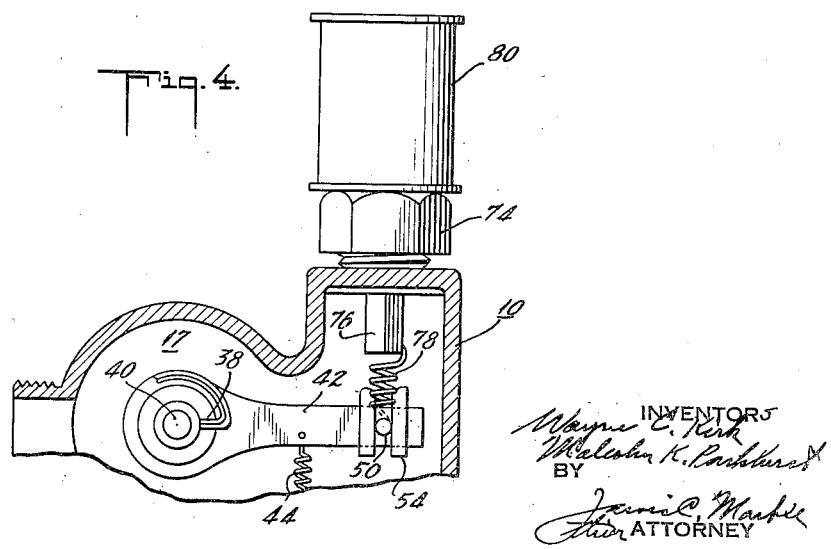

Patented Apr. 24, 1951

2,550,069

UNITED STATES PATENT OFFICE 2,550,069

THERMOSTATICALLY CONTROLLED MIXING VALVE

Wayne C. Kirk, South Bend, Ind., and Malcolm K. Parkhurst, New York, N. Y.; said Kirk assignor to Lyndon W. Burch, New York, N. Y.

Application June 25, 1946, Serial No. 679,088

2 Claims. (Cl. 236—12)

Our invention relates to thermostatically controlled mixing valves and more particularly to valves of this type especially designed for use with automatic washing machines for regulating the temperature of the water admitted thereto. It is desirable in an automatic washing machine to provide means whereby the operator may select the temperature of the water, depending upon the nature of the material to be washed. For example, certain materials such as silk, rayon and woolens, should be washed in water in the neighborhood of 100° F., whereas others, such as cottons, may be washed in water having a temperature as high as 150° F. Accordingly, it is desirable that the operator be able to change the setting of the mixing valve so as to give a water mixture having either of these temperatures, and it is highly advantageous that the setting of the valve be shiftable from a remote point.

In addition, many housewives desire to be able to adjust particularly the upper of these temperatures.

In order to meet these requirements a valve in accordance with our invention is provided with an electro-magnet for shifting the setting of the valve from the low to the high temperature value, which magnet may be controlled at any remote point by means of an electric switch.

In addition, the higher temperature value may be adjusted by rotating a shaft, as by means of a knob secured thereto. Provision is also made for adjusting the lower temperature value, but inasmuch as this value in practice seldom needs to be adjusted by the operator, the means for making the adjustment preferably is not accessible from the operating panel of the washing machine.

Further objects and advantages of our invention will be apparent from the following description considered in connection with the accompanying drawings, which form a part of this specification, and of which:

Fig. 1 is a top view of a mixing valve in accordance with our invention;

Fig. 2 is a cross-sectional view on an enlarged scale, taken on the line 2—2 of Fig. 1;

Fig. 3 is a cross-sectional view on a reduced scale, taken on the line 3—3 of Fig. 2; and Fig. 4 is a cross-sectional view on an enlarged scale, taken on the line 4—4 of Fig. 3.

Referring to the drawings, reference character 10 designates a valve housing formed with two inlet ports 12 and 14 and an outlet port 16. It will be assumed that the inlet port 12 is connected to a source of cold water under pressure while the inlet port 14 is connected to a source of hot water under pressure, normally the cold and hot water lines of a domestic plumbing system. The outlet port 16 is connected by a suitable conduit to the cylinder of the washing machine for conducting thereto the mixture formed in the mixing chamber 17.

Inlet port 12 communicates with the housing between valve seats 18 and 20, while inlet port 14 communicates with the housing between valve seats 22 and 24. A pair of balanced valves 26 and 28 are arranged to cooperate with the respective pairs of seats. These valves are spring-loaded by means of helical springs 30 and 32, respectively, which bias the valves towards closed position. The stems of the valves are hollow so that water passing the seats 18 and 22 may flow through the hollow stems to the mixing chamber 17 of the valve housing. Members 34 and 36, which may have the general shape of hair pins, are secured within the hollow stems of the two valves and abut against opposite sides of the free end of a bimetallic element 38. The major portion of this element is in the form of a spiral with the inner end thereof secured to a shaft which is turnably mounted within the housing 10. The strip of metal on the inner side of the bimetallic element has a higher coefficient of expansion than the strip on the outer side. Consequently, upon an increase in temperature the inner strip expands more than the outer, thus causing the spiral to unwind which in turn causes the free ends of the bimetallic element to move to the left, as viewed in Fig. 2, so as to simultaneously increase the opening through the valve 26 and decrease the opening through the valve 28.

The parts are so proportioned that both of these valves may be fully open or fully closed at the same time and when one valve is fully opened the other is fully closed.

Rigidly secured to the shaft 40 is one arm 42 which is biased in a clockwise direction, as viewed in Fig. 2, by the tension spring 44. Movement of the arm 42 in a clockwise direction is limited by means of a bolt 46 which is threaded through the casing 10 and is provided with a suitable packing 48 for preventing leakage of water. Secured to the arm 42 near the free end thereof is a pin 50 arranged to move up and down in slots 52 formed in the legs of a forked member 54. The member 54 has threaded engagement with a shaft 56 which is rotatably mounted in a bushing 58 carried by the housing 10. Any suitable means may be provided for preventing the leakage of water out of the housing along the shaft 56, and as shown the shaft is provided with a conical surface 60 which cooperates with a similar surface formed in the bushing. In addition, packing glands 62 are provided on the shaft and the two conical surfaces are maintained in engagement by means of a coil spring 64 compressed between the bushing 58 and a clamp 66 which is removably secured to the shaft by means of a setscrew 68. A knob 70 is secured to the shaft for the purpose of turning it.

As seen more particularly in Fig. 3, a tubular sleeve 72 made of copper or other suitable non-magnetic material is secured to an opening in the housing 10 by means of a nut. An armature 76, having an outer surface which is preferably hexagonal or of other non-circular shape is reciprocably mounted in the tubular member 72 and is connected at its lower end to the pin 50 by means of a spring 78. The non-circular shape of the armature is preferable in order to prevent water from becoming trapped in the upper end of the tube 72 and thus interfering with reciprocation of the armature. A solenoid coil 80 is arranged around the exterior of the tubular member 72 and is connected by means of leads 82 with any suitable source of electric current, a switch 84 being interposed in the circuit.

The above described device operates as follows:

If it is desired that the temperature of the water mixture leaving the valve through the outlet 16 be at the lower value, namely in the neighborhood of 100° F., the switch 84 is left open, whereupon spring 44 holds the arm 42 in its lower limit position against the upper end of the adjusting screw 46. With the shaft 40 and hence the inner end of the bimetallic element in the position determined by this position of the arm 42, the bimetallic element will so regulate the positions of the valves 26 and 28 that the mixture of the cold and hot water emitted from these valves and flowing in contact with the element in the mixing chamber 17 will be maintained at the desired lower temperature of about 100° F. If the temperature of the mixture tends to go above this value, the bimetallic element will immediately uncoil slightly so as to further open the valve 26 and further close the valve 28, thus increasing the proportion of the cold water admitted to the mixing chamber.

If it is desired to vary or adjust the value of the lower temperature maintained by the valve, this may be done by screwing the bolt in or out of the housing. If the bolt is screwed further in, it will rotate the arm 42 in a counterclockwise direction, thus increasing the lower temperature which the valve will maintain, while if the bolt is turned in the opposite direction, it will permit the spring 44 to turn the arm 42 further in clockwise direction, thus decreasing the value of the lower temperature.

When it is desired to change the setting of the valve so that the latter will maintain the higher temperature, the switch 84 is closed. This energizes the solenoid coil 80, thus causing it to draw the armature 76 upwardly within the tube 72. Inasmuch as the lower end of the armature is connected to the pin 50 carried by the arm 42, this turns the arm in a counter-clockwise direction, as viewed in Fig. 2, until the pin 50 strikes the ends of the slots 52 in the forked member 54. This in turn pivots the shaft 40 so as to cause the bimetallic element to increase the opening of the hot water valve 28 and to decrease the opening of the cold water valve 26. Under these conditions the bimetallic element will maintain the two valves in the proper position so that the water mixture is maintained at the higher temperature.

Inasmuch as the position of the ends of the slots 52 determines the position of the arm 42 when the solenoid is energized, the upper value of the temperature maintained by the valve may be adjusted by raising or lowering the forked member 54. This in turn may be accomplished by rotating the shaft 56 so as to cause the forked member to advance either upwardly or downwardly on the threaded portion of the shaft. Raising the forked member increases the value of the higher temperature, while lowering this member decreases the value.

From the foregoing description it will be seen that the values of the upper and lower temperatures may be adjusted independently of each other from the exterior of the valve housing and without in any manner disassembling the valve. Furthermore, the shift from the low to the high temperature values and vice versa is made without in any manner affecting the adjustments of either of these values, and the shifting may be made at any remote point by merely closing or opening the electric switch.

Due to the fact that the adjustment of the lower temperature is usually made only at the factory, and need not be made by the operator, a simple bolt 46 has been shown as employed for this purpose. However, if it is desirable to have this adjustment easily made by the operator, an arrangement similar to that including the shaft 56 could be substituted for the bolt 46.

Due to the balancing of both the hot and cold water valves, the mixing valve is unaffected by variations in the pressure of the water supplied thereto or by variations in the pressure of the hot water with respect to that of the cold water.

While we have shown one more or less specific embodiment of our invention, it is to be understood that this has been done for purpose of illustration only and that the scope of our invention is not to be limited thereby but is to be determined from the appended claims.

What is claimed:

1. In a mixing valve, a housing having hot and cold water inlet ports and an outlet port, a pair of balanced valve members movably arranged in said housing and disposed in the respective paths of flow between said inlet ports and said outlet port, a shaft turnably mounted and enclosed within said housing, a bimetallic element having one end secured to said shaft and the other end connected to simultaneously adjust the positions of said valves, an arm within said housing secured to said shaft, abutment means for limiting the turning of said shaft in both directions, one of said abutment means including a threaded member, a shaft rotatably mounted in and extending through said housing and having threaded engagement with the abutment member, whereby rotation of the last-mentioned shaft changes the position of said abutment member, and means operable from the exterior of said housing for turning said arm from contact with one of said abutment means to contact with the other abutment means.

2. In a mixing valve, a housing having hot and cold water inlet ports and an outlet port, a pair of balanced valve members movably arranged in said housing and disposed in the respective paths of flow between said inlet ports and said outlet port, a shaft turnably mounted and enclosed within said housing, a bimetallic element having one end secured to said shaft and the other end connected to simultaneously adjust the positions of said valves, an arm within said housing secured to said shaft, abutment means for limiting the turning of said shaft in both directions, a sleeve of non-magnetic material having an open end secured in an opening in said housing and the other end closed, a solenoid coil disposed around the outside of said sleeve, an armature reciprocable within said sleeve and connected to said arm, said armature being attracted by energization of said solenoid to move said arm into contact with one of said abutment means, spring means biasing said arm towards the other abutment means, one of said abutment means including a threaded member, and a shaft rotatably mounted in and extending through said member and having threaded engagement with the abutment member, whereby rotation of the last-mentioned member from the exterior of said housing changes the position of said abutment member.

WAYNE C. KIRK.
MALCOLM K. PARKHURST.

REFERENCES CITED

The following references are of record in the file of this patent:

UNITED STATES PATENTS

| Number | Name | Date |
|---|---|---|
| 1,597,773 | Dodge | Aug. 31, 1926 |
| 1,787,304 | Becker | Dec. 30, 1930 |
| 1,932,148 | Schneider | Oct. 24, 1933 |
| 2,064,053 | Balzer | Dec. 15, 1936 |
| 2,287,810 | Lund | June 30, 1942 |
| 2,296,266 | Breckenridge | Sept. 22, 1942 |
| 2,448,170 | Brown | Aug. 31, 1948 |